US009111223B2

(12) United States Patent
Schmidt et al.

(10) Patent No.: US 9,111,223 B2
(45) Date of Patent: Aug. 18, 2015

(54) PREDICTING USER INTERACTIONS DURING IMAGE PROCESSING

(75) Inventors: Stefan Matthias Florian Schmidt, Biebertal (DE); Sebastian Peter Michael Dries, Hamburg (DE); Jens Von Berg, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 47 days.

(21) Appl. No.: 13/145,615

(22) PCT Filed: Jan. 13, 2010

(86) PCT No.: PCT/IB2010/050123
§ 371 (c)(1),
(2), (4) Date: Dec. 27, 2011

(87) PCT Pub. No.: WO2010/084435
PCT Pub. Date: Jul. 29, 2010

(65) Prior Publication Data
US 2012/0095953 A1    Apr. 19, 2012

(30) Foreign Application Priority Data

Jan. 22, 2009  (EP) .................................. 09151059

(51) Int. Cl.
*G06F 9/44*  (2006.01)
*G06N 7/02*  (2006.01)
(Continued)

(52) U.S. Cl.
CPC ............ *G06N 5/048* (2013.01); *G06K 9/00335* (2013.01); *G06N 7/005* (2013.01); *G06N 99/005* (2013.01)

(58) Field of Classification Search
None
See application file for complete search history.

(56) References Cited

U.S. PATENT DOCUMENTS 6,959,109 B2 * 10/2005 Moustafa ..................... 706/20
7,245,749 B2    7/2007 Okuzawa
(Continued)

FOREIGN PATENT DOCUMENTS

JP    2001273067 A    10/2001

OTHER PUBLICATIONS

"A Novel Video Coding Scheme Based on Temporal Prediction Using Digital Image Warping" Jacek Niewgglowski, T. George Campbell, and Petri Haavisto Signal Processing Laboratory/Tampere University of Technology, Finland Manuscript received Jun. 11, 1993 0098 3063/93 $03.00 1993 IEEE.*
(Continued)

*Primary Examiner* — Kakali Chaki
*Assistant Examiner* — Luis Sitiriche

(57) ABSTRACT

The invention relates to an apparatus for processing images by means of a series of user interactions. When processing an image, the user follows a series of interactions. Preferably, this is standardized to ensure reproducibility and accuracy. However, the series of interactions required from the user may be dependent on the needs of the user, the image being processed or even on the preferences of the user. The invention provides an apparatus which can deal with complex image processing requirements, providing both a standardized series of steps, or trail, in the image visualization process, and allowing the user to deviate from this standard trail if required. This accelerates and simplifies the interaction necessary when the user performs a known task on a different image. It also provides valuable assistance when the user performs an unfamiliar task, thereby avoiding mistakes, such as incorrect radiation levels during image acquisition, which can have serious consequences in a medical imaging environment.

18 Claims, 5 Drawing Sheets

(51) Int. Cl.
G06N 7/06 (2006.01)
G06N 5/04 (2006.01)
G06K 9/00 (2006.01)
G06N 7/00 (2006.01)
G06N 99/00 (2010.01)

(56) References Cited

U.S. PATENT DOCUMENTS

| | | | |
|---|---|---|---|
| 7,949,617 B1* | 5/2011 | Higgins et al. | 706/11 |
| 2004/0193413 A1* | 9/2004 | Wilson et al. | 704/243 |
| 2005/0107689 A1 | 5/2005 | Sasano | |
| 2007/0016016 A1 | 1/2007 | Haras et al. | |
| 2007/0063998 A1 | 3/2007 | Mahesh | |
| 2007/0076929 A1 | 4/2007 | Gentles et al. | |
| 2007/0109008 A1 | 5/2007 | Wang | |
| 2008/0147086 A1* | 6/2008 | Pfister et al. | 606/130 |
| 2009/0112781 A1* | 4/2009 | Heath et al. | 706/21 |

OTHER PUBLICATIONS

Anonymous; SmartExam-aided functional MRI protocols; 2008 http://incenter.medical.philips.com/doclib/ebc/fetch/2000/4504/3634249/3634100/4987812/5025553/5068598/5068135/ F34_SmartExam_fMRI_protocols_Bonn.pdf%3fnodeid%3d5069118%/26vernum%3d1.

Celeux, G., et al.; Selecting Hidden Markov Model State Number with Cross-Validated Likelihood; 2008; Computational Statistics; 23(4)541-564.

Klemm, M., et al.; Esodyp+:Prefetching in the Jackal Software DSM; 2007; Parallel Processing; Lecture Notes in Computer Science; Springer; pp. 563-573.

Olabarriaga, S. D., et al.; Interaction in the segmentation of medical images: A Survey; 2001; Medical Image Analysis; 5:127-142.

Vano, E., et al.; Real-Time Measurement and Audit of Radiation Dose to Patients Undergoing Computed Radiography; 2002; Radiology; 225:283-288.

Zhou, J., et al.; Understanding Human-Computer Interactions in Map Revision; 2004; LNCS Springer Human Shape and Action; vol. 3138; pp. 287-295.

Kimura, T. et al. "An Parameter Search Method in Image Processing System Based on Candidate Image Selection by User", Information Processing Society of Japan, vol. 49, No. 1, Jan. 2008, p. 513.

* cited by examiner

PREDICTING USER INTERACTIONS DURING IMAGE PROCESSING

FIELD OF THE INVENTION

The invention relates to a method and apparatus for predicting user interactions during image processing, and to a computer program product for carrying out the method when loaded and run on a computer.

The invention also relates to a medical imaging system comprising an apparatus for predicting user interactions during image processing.

BACKGROUND OF THE INVENTION

The processing of medical images, for example diagnostic or therapeutic images, typically requires a considerable amount of user interaction. Examples include: acquiring an image, zooming in/out, selecting particular views, selecting particular regions of interest, selecting particular volume slices, selecting particular sub-volumes, applying image processing algorithms and filters, altering presentation parameters such as brightness and false color mapping. When processing an image, the user follows a series of interactions. Preferably, this is standardized to ensure reproducibility and accuracy. However, the series of interactions may be dependent on the needs of the user, the image being processed or even on the preferences of the user. In the context of the invention, image processing means processing images using manual or computer-implemented interactions.

Current medical image viewing applications, such as Picture Archiving and Communication Systems (PACS) and workstations such as Extended Brilliance Workspace (EBW), offer a broad range of viewing and image processing options, which means that the different users performing the same task may produce an acceptable result in different ways. Some standardized views are offered, but this does little to standardize the steps taken during image processing.

A standard series of interaction steps may be defined for particular types of image processing, and the user is instructed to follow these steps for each new image data set; for example, in processing images of hypertrophic male hearts, the steps taken by a radiology consultant may be:

- Browsing through the data at planes perpendicular to the longitudinal axes of the heart
- Starting from the basis, with the aorta in the lower left corner
- Zoom adjusting to fill view with left ventricle
- Setting display contrast such that only the myocardium is within the grey value window
- Selecting 2 planes at one-third and two-thirds of the ventricle height for display
- Measuring using concentric circles tool
- Printing out the viewing planes at one-third and two-thirds of the ventricle height
- Selecting standard plane number 1
- Adjusting levels and adjusting window
- Printing out plane number 1
- Selecting standard plane number 2
- Adjusting levels and adjusting window
- Printing out plane number 2

However, from this example it will be apparent to the skilled person that the actual action taken by the user to carry out these steps may vary considerably, depending on the parameters of the image. For example, in filling the view with the left ventricle, the actual magnification chosen or the size of the zoom selection box is dependent on the magnification at which the original image was acquired. Also the position of the ventricle in the image may vary, forcing the user to zoom and pan, or to draw a zoom selection box at different positions.

The situation is more complicated in practice, because the starting image set may vary depending on, for example, the user's preferences, the modality and the equipment used to acquire the image data set. In addition, the user may wish to vary the procedure, based upon, for example, the user's preference and the contents of the images viewed.

It is known to compare radiological imaging results with a set of expected parameters to detect deviations. "Real-Time Measurement and Audit of Radiation Dose to Patients Undergoing Computed Radiography" by Vano, Fernandez et al, Radiology 2002 225: 283-288; discloses a real-time patient dose monitoring system for auditing computed radiography. Technical data from each exposure and for every examination type are collected and sent by a network to a workstation, which calculates the moving average values of entrance skin dose and dose-area product of the ten most recently examined patients. Comparison of averages with reference values generates warning messages if reference values are exceeded, prompting corrective action if necessary. However, such a comparison system restricts the freedom that users have to perform the procedure, and deviations are presented after the fact.

SUMMARY OF THE INVENTION

It is an object of the invention to provide an apparatus for processing images by means of a series of user interactions.

The invention is defined by the independent claims. Advantageous embodiments are defined in the dependent claims.

According to a first aspect of the invention, the object is achieved using an apparatus for processing images by means of a series of user interactions, comprising a predictor configured for predicting user interactions; a monitor configured for monitoring the series of user interactions during image processing, configured and arranged to provide at least one step in the series to the predictor, wherein the predictor is configured to provide at least one subsequent user interaction step.

The invention provides an apparatus which can deal with complex image processing requirements, providing both a standardized series of steps, or trail, in the image visualization process and allowing the user to deviate from this standard trail, if required. This accelerates and simplifies the interaction necessary when a known task is being performed on a different image. It also provides valuable assistance when an unfamiliar task is being performed, thereby avoiding mistakes, such as incorrect radiation levels when an image is being acquired, which can have serious consequences in a medical imaging environment.

The invention is based upon the insight that user interactions are relatively simple to collect, but making practical use of this data is very limited when use is made of known techniques. There may be many ways to achieve the same result, so that a comparison of these ways to each other is not advantageous in many practical cases. The invention is based upon the insight that this rich source of data may be utilized more fully when it is combined with a prediction model, so that not only the user interaction is compared, but also the context within which the user interaction is performed.

According to an aspect of the invention, the predictor is further configured to perform the at least one subsequent step. In this way, user interactions may be automated to a higher degree.

According to an aspect of the invention, the predictor is configured to prompt the user to perform the at least one subsequent step. In certain situations, it may be advantageous to prompt the user to confirm that a subsequent step should be carried out. This may be particularly advantageous if the apparatus is being used to provide input for the predictor.

According to another aspect of the invention, the monitor is further configured to display a current image to the user, and the predictor is further configured to provide at least one subsequent user interaction step for displaying a subsequent image to the user. This may be advantageous as it provides an image-by-image way of proceeding through the image processing. In the medical imaging field, this is particularly intuitive and user-friendly as the user may go from view to view.

According to a further aspect of the invention, the predictor is configured for predicting user interactions, using at least one user interaction step previously recorded during image processing. Depending upon the variation expected in a series of user interactions, it may be advantageous to supply the predictor in a training mode with one or more actual user interactions.

According to another aspect of the invention, a method is provided for predicting user interactions during image processing, comprising determining a prediction model of user interactions; monitoring a series of user interactions during image processing; providing the prediction model with at least one step from the series of interactions, and determining at least one subsequent step using the prediction model. The image processing apparatus according to the invention is configured to perform this method.

According to a further aspect of the invention, a computer program product is provided for carrying out the method of the invention when loaded and run on a computer.

It will be appreciated by those skilled in the art that two or more of the above-mentioned embodiments, implementations, and/or aspects of the invention may be combined in any way deemed useful.

Modifications and variations of the image processing apparatus, of the workstation, of the system, and/or of the computer program product, which correspond to the described modifications and variations of the method or the apparatus, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF THE PREFERRED EMBODIMENTS

Figure 1:
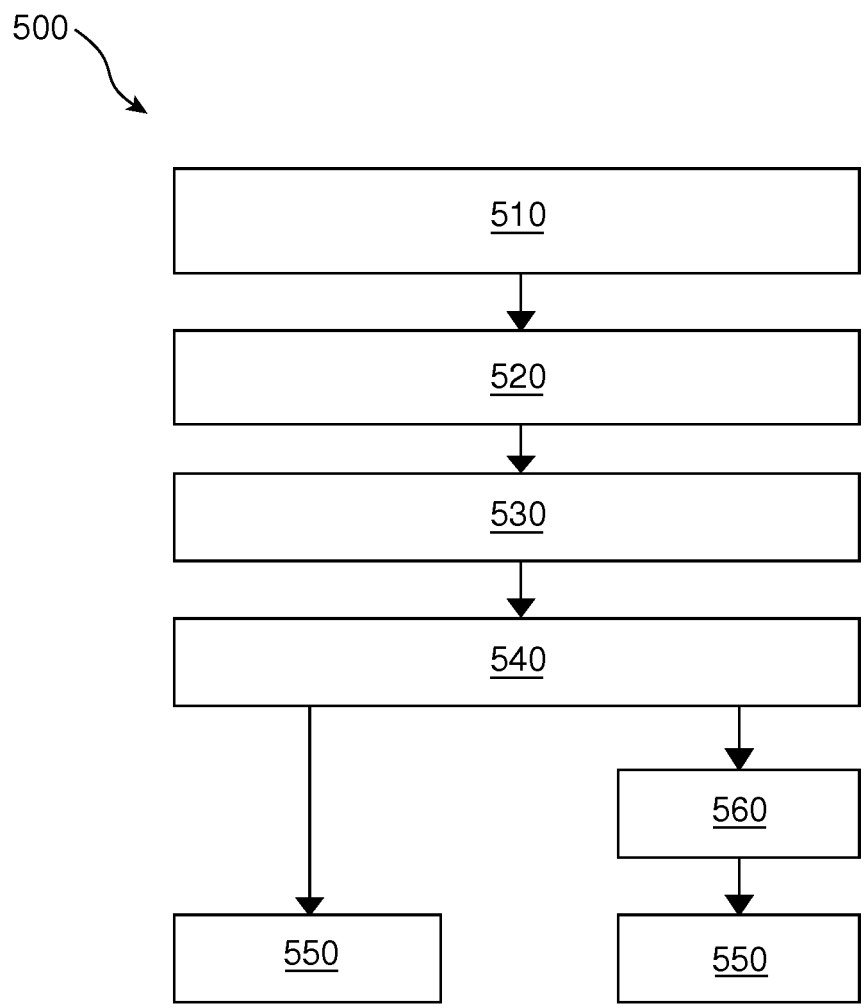
FIG. 1 depicts a method of predicting user interactions during image processing according to the invention.

FIG. 1 depicts a method 500 of predicting user interactions during image processing according to the invention. Image processing is used as a general term to cover any part of the steps required to generate or acquire an image, including taking scans, wherein the steps taken by the user may influence the image. Processing may be done manually, using computer-implemented tools or any combination thereof.

The method 500 comprises:
determining 510 a prediction model of user interactions;
monitoring 520 a series of user interactions during image processing;
providing 530 the prediction model with at least one step from the series of interactions, and
determining 540 at least one subsequent step, using the prediction model.

In the method 500 depicted in FIG. 1, a prediction model of user interactions is determined 510. Although any techniques available to the skilled person for constructing a predictive model may be used, such as statistics or fuzzy logic, a preferred embodiment makes use of a Markov Model. The Markov Model may contain state variables modeling the time-discrete steps in the series of user interactions and additional observation variables representing meaningful image-related variables. In the Markov Model, these variables are related to each other by conditional probability distributions—the transition probability is the conditional probability of a state given the previous state, and the output probability represents the conditional probability of the observation given the current state. Such meaningful image features include:

Global image properties, such as contrast and histograms
Region of interest image properties
Region of interest relative to anatomic landmarks
Region of interest relative to automatically-determined anatomic landmarks
Features determined by analysis of image data sets
Features determined by massive training (boosting) from a variety of simple image filters, such as Haar-wavelets.

It may be advantageous to generate and optimize a prediction model for a particular examination type, such as examining hypotrophic male hearts, as this reduces complexity. Alternatively, a common model may be trained that automatically discriminates the examination type. Within the framework of a Markov Model, hidden (unobserved) variables are introduced to define a Hidden Markov Model (HMM), reducing the need for a library of models. The hidden variable indicates a type for the trail of user interactions, which is only probabilistically related to the examination type. Optimizing this model may be performed by clustering on this hidden variable.

Figure 2:
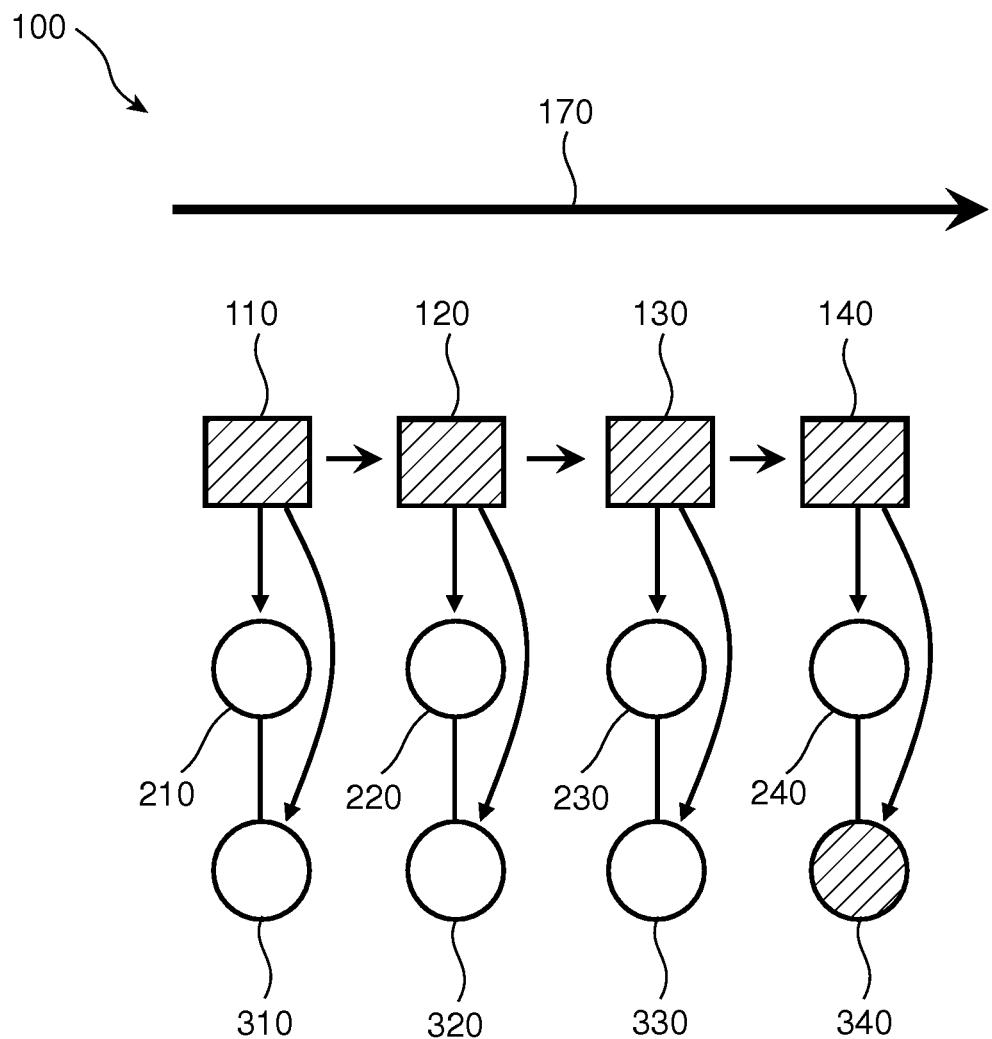
FIG. 2 depicts an example of a prediction model according to the invention.

The Hidden Markov Model, depicted in FIG. 2, represents the information learned and infers subsequent steps in the user interaction trail to image visualization (visualization trail). It describes time-series data, such as the visualization trail according to the invention, by dividing the observed sequences into discrete time steps i, where i may be an integer from 1 to T. In each time step the model is in one of a set of discrete states (Zi, Xi, Yi), which comprise an unobservable ("hidden") variable Zi, and observable features Xi and Yi associated with the unobservable variable Zi. In this context, the observable variables include the viewer settings Xi in a given time step i and other observable features Yi (derived from the viewed data, e.g. the image or objects shown).

This architecture is depicted as a Probabilistic Graphical Model in FIG. 2. Four hidden states 110, 120, 130, 140 in such a visualization trail Z1, Z2, Zi and ZT, respectively, are depicted. An arrow 170 indicates the general progression of time from state Z1 to ZT, and the transition from one state to a later state is indicated by horizontal arrows.

Associations within the model are indicated by vertical arrows between the states and nodes. Each hidden state 110, 120, 130, 140 is associated with feature nodes Y1, Y2, Yi and YT, respectively, labeled respectively as 210, 220, 230 and 240. Each hidden state Z1 to ZT is also associated with setting nodes X1, X2, Xi and XT, respectively, labeled respectively as 310, 320, 330 and 340. Each feature node Y1, Y2, Yi and YT is associated with setting nodes X1, X2, Xi and XT, respectively. States Z1 110, Z2 120, Zi 130 and ZT 140 and node XT 340 are provided with a hatching to indicate that they are hidden. The other states and nodes are not hatched and therefore observable. States Z1 110, Z2 120, Zi 130 and ZT 140, which are discrete, are indicated as squares, and the features and setting nodes 210,220,230,240,310,320,330,340,which are continuous, are indicated as circles. The model may be used to infer the subsequent settings XT at a future time point T.

The model encodes the learned information via two kinds of conditional probabilities associated with the states Z1, Z2, Zi and ZT. The probability of the system being in state Zi after it was in state Zi−1, indicated by the horizontal arrows in FIG. 1, is given by the transition probabilities $P(Z_i|Z_{i-1})$. The probability of an observation if the system is in state Zi is determined by $P(X_i,Y_i|Z_i)$. Thus, the overall probability of a sequence may be expressed as:

$$P_0(Z_1) \prod_{i=2}^{T} P(Z_i|Z_{i-1}) P(X_i, Y_i|Z_i)$$

where P0 is a prior distribution on the initial state of the system.

The finite set of discrete states of the HMM model represents the different types of intermediate steps that the user performs. To reduce complexity, it may be advantageous to associate each intermediate step with the viewing of a particular desired intermediate image—in other words, user interactions are clustered into those which result in the intermediate image, or view, desired. This provides the user with an apparatus that processes images in steps, each step being associated with a view. Although these steps may be given distinct names (e.g. "long axis view of the heart", "view of pulmonary valve plane view with window setting XY"), they do not need to be known to the model a priori. Instead, the common states that are traversed in typical viewing sequences may be discovered automatically from training data when the model is optimized during a learning phase.

The observations may be modeled as continuous variables using $P(X_i,Y_i|Z_i)$ as a joint normal distribution (conditioned on state). The skilled person may also use more complex observation models, such as mixture models, which are well-known in the art. These observations comprise the viewer settings X1 310, X2 320, Xi 330 and XT 340, which includes a large selection of the interaction possibilities available to the user, such as the view geometry (for example, selection of viewed 2D plane) or the intensity transfer function settings.

The other observable features Y1 210, Y2 220, Yi 230 and YT 240 are calculated from the image data or displayed objects themselves, including positions and geometry of automatically segmented anatomical objects, global and local intensity histograms, and other computationally accessible features of interest that the viewing decisions could be based on. Missing features (for example, due to objects considered in the model, but not found in the images) may be handled by marginalizing over their possible values.

The number of discrete states is an important parameter of the learning model. The more states the model has, the better it is capable of adapting to training data. To prevent possible over-fitting effects, the optimal number of states may be selected using standard model selection methods such as the AIC (Akaike Information Criterion) and BIC (Bayesian Information Criterion) penalized likelihood methods or cross-validation techniques. Details may be found, for example, in "Selecting hidden Markov model state number with cross-validated likelihood" by Gilles Celeux and Jean-Baptiste Durand, Comput. Stat., 23(4):541-564, 2008; and "Model selection and multi-model inference" by Burnham and Anderson, Springer, New York, N.Y., USA, 2002.

When the model is used for prediction, the partly observed interaction sequence up to the current time point is fed into the model. Using, for example, the Viterbi HMM decoding algorithm, the most likely sequence of states is recovered, which includes the most probable current (hidden) viewing state that the user put the system into, together with an estimate of the probability of the state sequence that the model found. The latter is used to reject low-probability sequences (which the system does not know about) by imposing a threshold.

Resorting to Markovianity, the inferred most probable state also allows the probabilities of the subsequent state to be determined with respect to the previous states. Thus, for each likely next state, the effect of the state transition can be predicted, giving rise to a set of observations of that state. The unknown settings associated with the next state will then be found by additionally conditioning on these and solving them for $P(XT|YT,ZT)$.

Generating or optimizing the prediction model 100 may employ user interactions monitored during image processing as training data. In this way, typical trails to visualization may be determined and optimized.

In the method 500 depicted in FIG. 1, a series of user interactions during image processing are monitored 520, the prediction model is provided 530 with at least one step from the series of interactions, and at least one subsequent step is determined 540 using the prediction model. A user may use a workstation to perform these interactions, for example during image acquisition, image viewing, image analysis and image modification.

Figure 3:
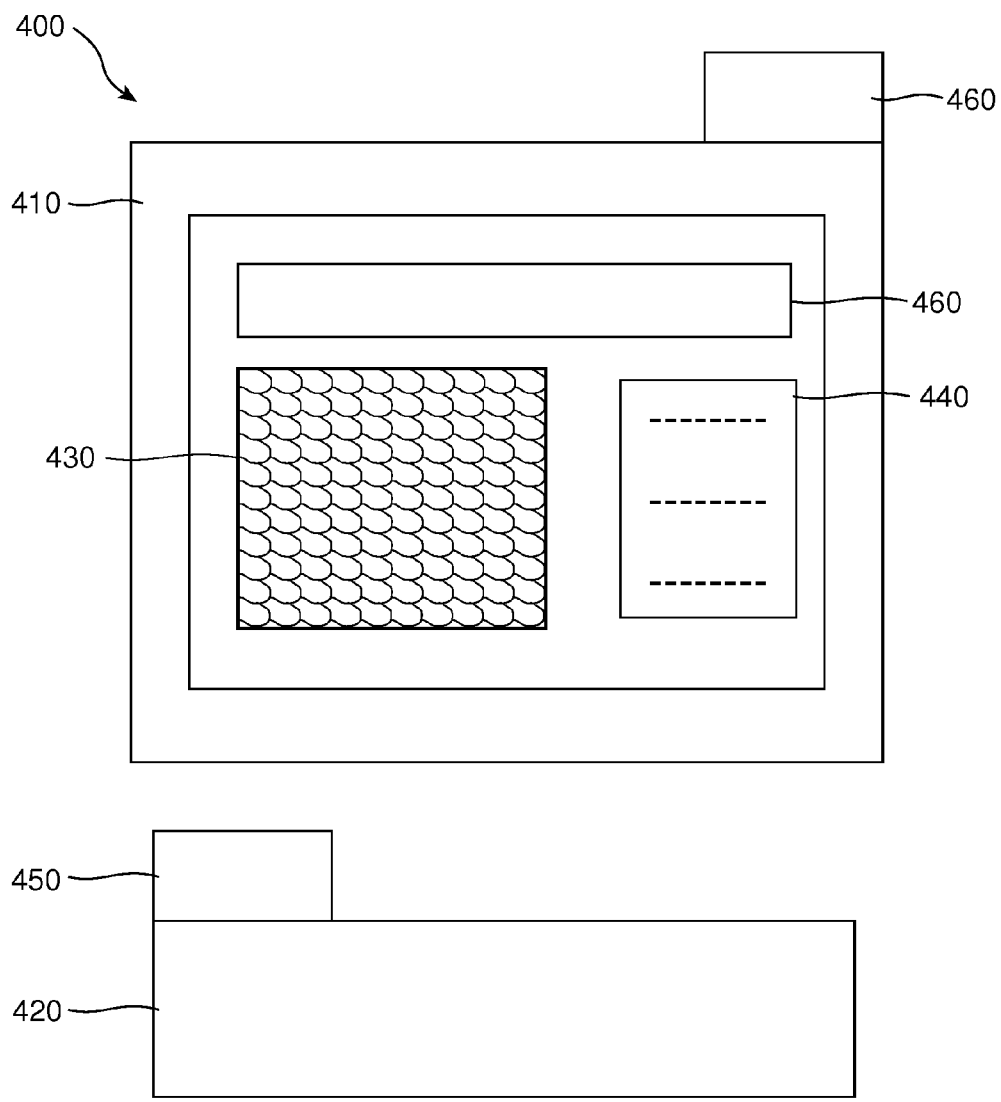
FIG. 3 shows an example of an apparatus for processing images by means of a series of user interactions according to the invention.

An example of such a workstation 400 is depicted in FIG. 3. The workstation 400 comprises a display screen 410 for displaying an image 430 and for displaying one or more user interactions 440. The user interactions 440 may be provided in one or more forms, such as icons, thumbnails, menus, and pull-down menus.

The workstation 400 also comprises a means 420 for the user to interact with the workstation 400, which may comprise a keyboard, mouse, trackball, pointer, drawing tablet.

The workstation 400 further comprises a predictor 460 for predicting user interactions, a monitor 450 for monitoring the series of user interactions made using the interaction means 420 during image processing.

The predictor 460 is configured to assess where the user interaction is, in the series of interactions, in relation to the series available in the prediction model 100. The monitor 450 is therefore arranged to provide at least one of the actual user interactions to the predictor 460.

The user interactions that are monitored 520 may be a standard set, or they may be tailored based upon, for example, the image type being processed, the image contents being processed, and the goal of the image processing. Typical user interactions which would be monitored include:

Selection of a new view
Zoom level
Distance panned
Region displayed
Slice displayed
Brightness transfer function applied
Image processing filters applied
Visualizing annotations
Visualizing segmentations
Displaying fused views To ensure that no contextual information is lost, the monitor 450 may also monitor the order in which the interaction steps are performed. It may also be advantageous to prompt the user to directly provide information to optimize the determination 540 of a subsequent step—for example, the image type being processed, the image contents being processed, and the goal of the image processing.

It may be advantageous to provide the monitor 450 with information related to the image, such as image intensities, references within an anatomical object, an anatomical landmark, data about how the image was acquired. This data may be provided as metadata with the image data, as dataset annotation such as DICOM entries, or it may be extracted using some form of image processing such as a clustering procedure based on image features.

In some imaging modalities, such as MRI for a human heart, landmarks are generated by using such image processing tools as SmartExam or Computer-Aided Detection (CAD) applications. Such a landmark identifies anatomically meaningful points or regions of interest in the image.

It may be advantageous to provide each user interaction with a time stamp, so that the duration of each interaction may be considered by the predictor 460.

The predictor 460 comprises the prediction model 100, and is configured to provide a subsequent user interaction step to the user, based upon the interactions provided by the monitor 450. As the skilled person will realize, said subsequent user interaction step may be provided in different ways, depending upon how the subsequent step information will be used. It may be provided to the monitor 450 so that the user may select it, or it may be provided directly to the apparatus 400 so that the subsequent step may be performed automatically.

The workstation 400 may be configured to perform this predicted subsequent interaction, either fully automatically or following confirmation by the user. This is particularly useful if the predictor 460 provides, with a high degree of probability, a single interaction. However, it may even be advantageous in the case of several predicted possibilities, if one interaction has a significantly higher degree of probability of being performed automatically.

Additionally, a countdown timer may be employed associated with the most probable subsequent step. After the timer has elapsed the most probable subsequent step will be automatically selected. The user friendliness of such a timer would be improved by presenting the user with a representation of the timer and indicating to the user the most probable subsequent step. If the model incorporates detailed time information, the value used for the countdown timer may also be determined by the model.

In an embodiment of the invention, both manual and automatic step execution may be combined such that when a thumbnail 440 is selected, the view indicated by its picture is displayed by executing one or more appropriate user interactions determined by the prediction model 100.

When thumbnails 440 are presented, it may be advantageous to use the original image to generate the thumbnails 440—the features of the thumbnail (reference to image or segmentation object, geometry, contrast) may then be determined using the prediction model 100 and applied to the image data for the current step. Alternatively, the thumbnails 440 may be generated using typical or average image data collected using a learning phase from training data. It may be advantageous to animate the thumbnails with a representation of a plurality of subsequent views, for example, an organ at different viewing angles.

In case of the countdown timer, a pause or discard autosequence option may be provided via the user interface 420.

In situations where the complete series of user interactions are predicted, a fully automatic mode may simply be started by the user who will then see a video stream of the image processing.

It may also be advantageous for the user to be presented with a representation 460 of the total visualization trail, so that the user can see the steps already performed and the current position in the trail. Preferably, these are presented as thumbnails depicting the series of intermediate images which have been generated. Optionally, the model may also determine subsequent intermediate images to be presented in the representation 460.

The workstation 400 may also be configured to present one or more predicted interactions to the user in an appropriate way 440 on the display screen 410. Prompted in this way, the user may then select the user interaction 440 that he desires. It may be advantageous to show the interaction options in such a way that the user is given an incentive to choose the one with the highest degree of probability. For example, the option with the highest probability may be brought to the attention of the user by:

A numerical indication of the probability
Placing the highest probability option at the top of a list, or at the front of the display
Making the highest probability visually different from the rest of the options, for example, bigger, flashing in intensity, animated, or of a different color.

Figure 4:
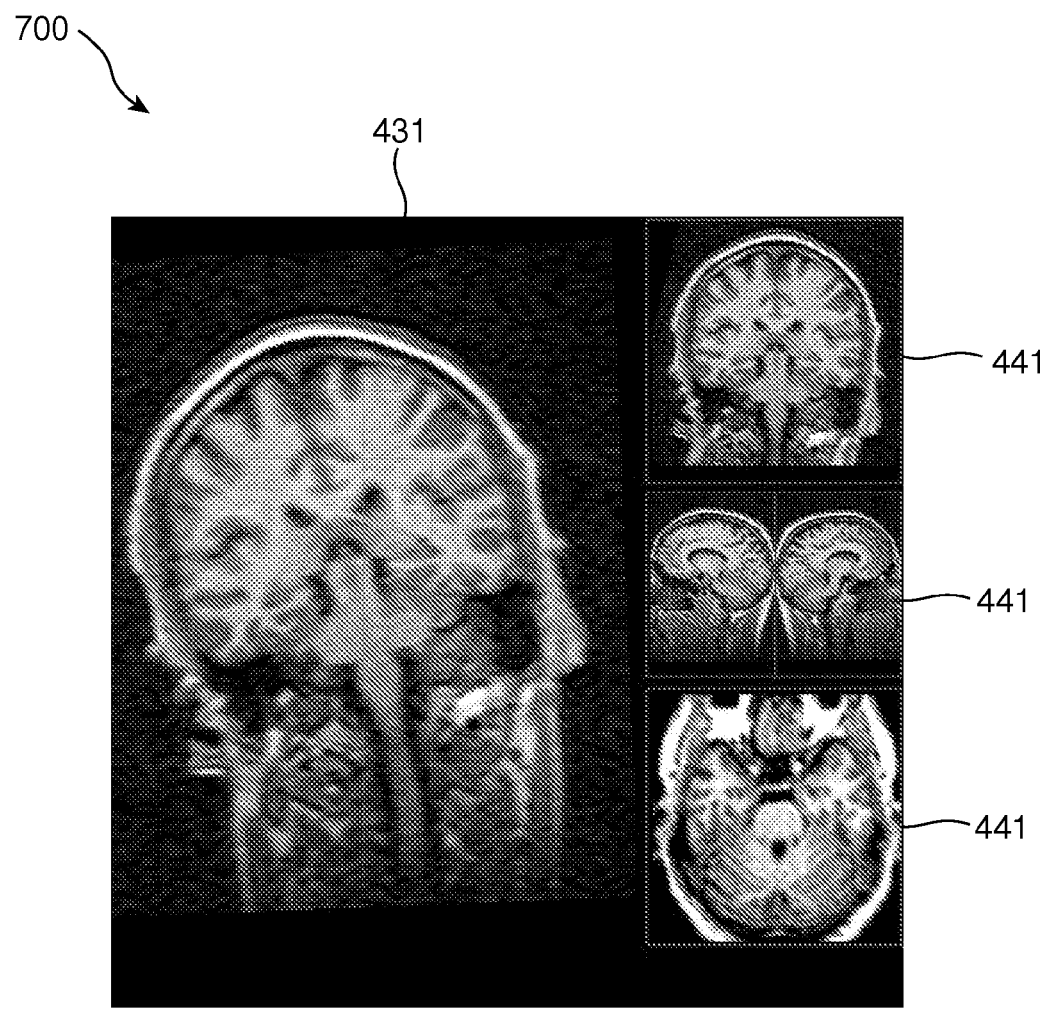
FIG. 4 depicts an example of a display screen prompting the user to select a user interaction during the processing of brain images.
Figure 5:
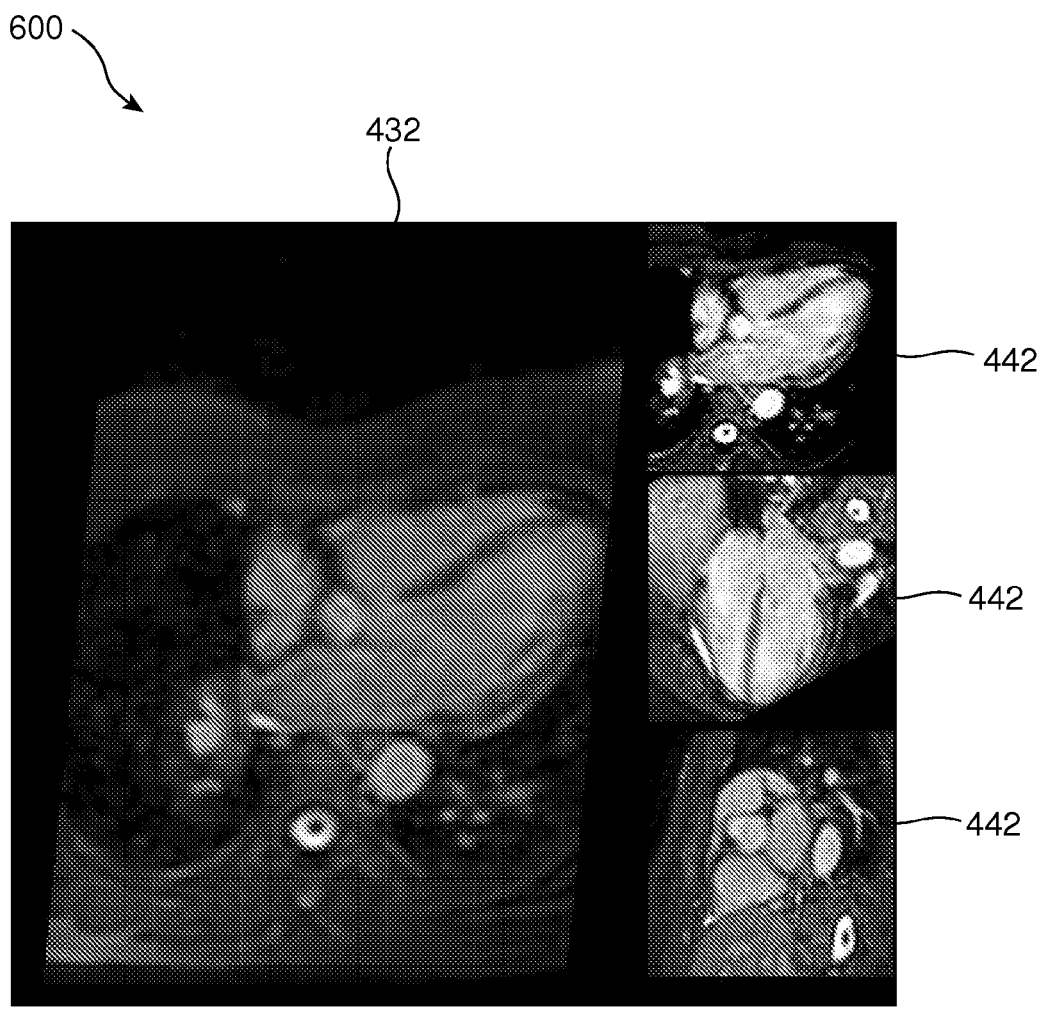
FIG. 5 depicts an example of a display screen prompting the user to select a user interaction during the processing of heart images.

Examples of presentations to the user on the display screen 410 are shown in FIGS. 4 and 5. FIG. 4 depicts a step 700 in the trail for visualizing an image of the human brain. A main image 431 is generated on the display screen 410—this is the image visualized by the user in the current step of the visualization series of steps. Proximate to the main image 431, the user is presented with three possible subsequent steps 441. These subsequent steps have been determined by the prediction model 100, and are presented here as thumbnails. In this example, the thumbnail at the top represents the most probable subsequent step 441. Presentation as thumbnails provides the advantage that the user will visually recognize the option being presented, and gives the user the option of deviating from the most probable path, so that he can adapt the visualization trail followed, based upon the steps he has followed so far and the diagnostic or therapeutic results obtained. Animated thumbnails using a plurality of subsequent views of the brain would be particularly user-friendly.

Similarly, FIG. 5 depicts a step 600 in the trail for visualizing an image of the human heart. A main image 432 is generated on the display screen 410—this is the image visualized by the user in the current step of the visualization series of steps. Proximate to the main image 432, the user is presented with three possible subsequent steps 442. These subsequent steps have been determined by the prediction model 100, and are presented here as thumbnails. In this example, the thumbnail at the top represents the most probable subsequent step 442.

Series of user interactions may also be recorded by the monitor 450 to provide input for generating or tuning the prediction model in the predictor 460. In this way, practical use of the method according to the invention will result in the continuous improvement of the prediction model 100.

The embodiments of these apparatus indicate parts such as a predictor for predicting user interactions and a monitor for monitoring the user interactions. It will be apparent to the skilled person that this separation is based upon functionality and does not necessarily indicate separate, discrete pieces of hardware. For example, all functions may be performed by a single processor, each function may be assigned to a separate processor or each function may be divided over a plurality of processors. Additionally, the physical location of a plurality of processors is unimportant—they may be distributed over one or more locations, connected in some way by a communication pathway such as a network, or even over the Internet. In a preferred embodiment, the image processing apparatus is comprised in a medical workstation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An apparatus for processing medical images, comprising:
    an image processor that is configured to process the medical images of a patient to provide visualizations of an object within the patient based on user interaction steps, each user interaction step producing a revised visualization of the object;
    a prediction model of a sequence of possible visualizations of the object, based on prior recorded sequences of visualizations of similar objects;
    a monitor that is configured to monitor and record a series of user interaction steps while processing the medical images; and
    a predictor that is configured to use the prediction model to:
        predict at least one subsequent visualization of the object based on a current visualization of the object and at least one prior step in the recorded series of user interaction steps that resulted in the current visualization, and
        provide the predicted subsequent visualization on a display device.

2. The apparatus of claim 1, wherein the predictor is further configured to control the image processor to provide the subsequent visualization.

3. The apparatus of claim 1, wherein the predictor is further configured to prompt the user to enable the apparatus to accept the subsequent visualization as a new current visualization.

4. The apparatus of claim 1, wherein the image processor is further configured to display the current visualization to the user, and the predictor is further configured to concurrently provide the subsequent visualization to the user.

5. The apparatus of claim 4, wherein the predictor is further configured to provide a plurality of possible subsequent visualizations and to prompt the user to select the subsequent visualization from among the plurality of possible subsequent visualizations.

6. The apparatus of claims 1, wherein the predictor is further configured to prompt the user to select the subsequent visualization from two or more possible subsequent visualizations.

7. The apparatus of claim 1, wherein the predictor comprises a Markov Model.

8. The apparatus of claim 1, wherein the predictor comprises a Hidden Markov Model.

9. A medical imaging system comprising the apparatus according to claim 1.

10. A method of processing medical images comprising:
    processing medical images of a patient that includes an object within the patient to provide a current visualization of the object based on user interaction steps, each user interaction step causing a revision of the visualization of the object;
    accessing a prediction model of a sequence of possible visualizations of the object, based on prior recorded sequences of visualizations of similar objects;
    monitoring and recording a series of user interaction steps during the processing of the medical images;
    providing the prediction model with at least one prior step from the recorded series of user interaction steps that resulted in the current visualization of the object;
    determining at least one subsequent visualization of the object based on the current visualization of the object and the at least one prior step, using the prediction model; and
    displaying the predicted subsequent visualization on a display device.

11. The method of claim 10, including displaying the subsequent visualization concurrently with the current visualization.

12. The method of claim 10, including enabling the user to select the subsequent visualization from a plurality of possible subsequent visualizations predicted by the prediction model.

13. A non-transitory computer readable medium that includes a program that, when executed by a processor, causes the processor to:
    process medical images of a patient that includes an object within the patient to provide a current visualization of the object based on user interaction steps, each user interaction step causing a revision of the visualization of the object;

access a prediction model of a sequence of possible visualizations of the object, based on prior recorded sequences of visualizations of similar objects;

monitor and record a series of user interaction steps during the processing of the medical images;

provide the prediction model with at least one prior step from the recorded series of user interaction steps that resulted in the current visualization;

determine at least one subsequent visualization of the object based on the current visualization of the object and the at least one prior step, using the prediction model; and provide the predicted subsequent visualization on a display device.

14. The medium of claim 13, wherein the program causes the processor to prompt the user to enable the processor to adopt the subsequent visualization as the current visualization.

15. The medium of claim 13, wherein the program causes the processor to display the current visualization concurrently with the predicted subsequent visualization on the display device.

16. The medium of claim 13, wherein the program causes the processor to provide a plurality of possible subsequent visualizations and to prompt the user to select the subsequent visualization from among the plurality of possible subsequent visualizations.

17. The medium of claim 13, wherein the program causes the processor to determine the subsequent visualization using a Markov Model.

18. The medium of claim 13, wherein the program causes the processor to determine the subsequent visualization using a Hidden Markov Model.

* * * * *